Nov. 21, 1933.   I. NACHUMSOHN   1,935,857

ELECTRIC CREAM WHIPPER AND DRINK MIXER

Filed Nov. 18, 1932

INVENTOR.

Irving Nachumsohn

Patented Nov. 21, 1933

1,935,857

UNITED STATES PATENT OFFICE 1,935,857

ELECTRIC CREAM-WHIPPER AND DRINK MIXER

Irving Nachumsohn, Chicago, Ill.

Application November 18, 1932
Serial No. 643,227

3 Claims. (Cl. 259—122)

This invention relates to the improvement in electric cream whippers and drink mixers and more particularly to such types of electric motor driven mixers which are used for whipping cream, beating eggs, for mixing ice-cream and malted milk drinks, waffle and cake batters and numerous other substances.

One object of my invention is to provide a relatively simple device of the class described which can be manufactured economically.

Another object of my invention is to provide a device of the character described which obviates the necessity of employing different mixing attachments for mixing substances of different consistencies; for, by virtue of the size and shape of the bowl used, in combination with the speed of the mixing paddle and particularly certain power characteristics of the driving motor, only one simple and easily cleaned paddle need be provided.

A further object of this invention is to provide a device of the class described in which conventional brackets or stands for supporting the motor are eliminated, the cover of the mixing receptacle forming the sole support for the electric motor which drives the mixing element.

A still further object is to incorporate into a device of the character described an electric motor having certain constructional features and operating characteristics not contained in electric drink mixer motors in use heretofore; these special constructional features and power characteristics of the motor being so utilized in combination with other structure and arrangement of parts that a new and useful improvement is effected thereby.

To the attainment of these and other objects and advantages which will become apparent as the following specification progresses, the invention consists of the features of novelty described in the specification, illustrated in the accompanying drawing and more particularly pointed out in the appended claims.

Figure 1:
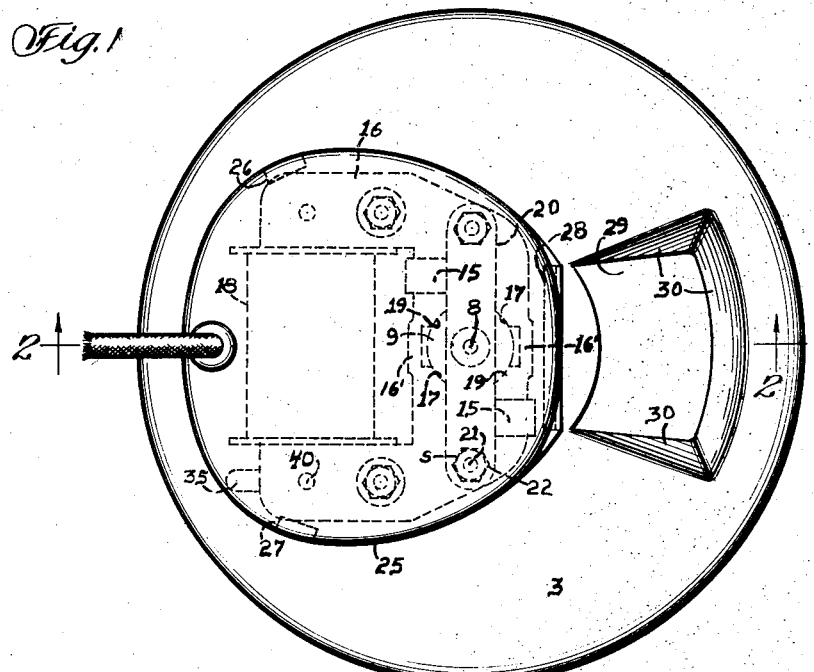
Figure 2:
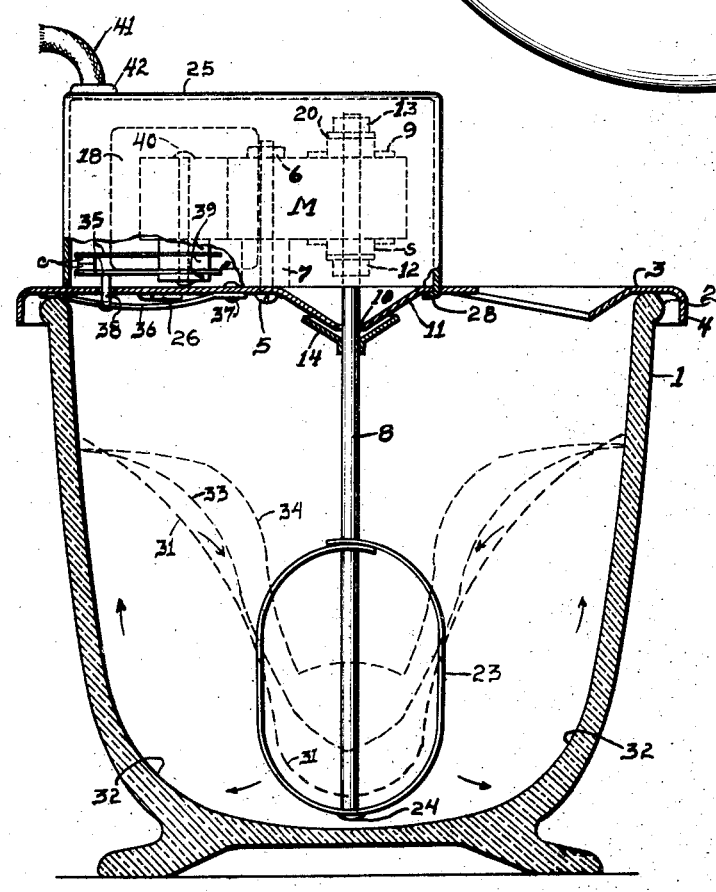

In the accompanying drawing Figure 1 is a plan view of the device while Figure 2 is a section as viewed along line 2—2 of Figure 1.

A mixing receptacle comprising a glass bowl for containing the ingredients to be mixed is shown at 1. It is provided with an upper bead or rim 2 which rim acts as the sole supporting means for a metal cover 3. Said cover is preferably a sheet metal stamping. It is circular in shape and the edge 4 thereof is formed into a cylindrical rim which is adapted to loosely fit the upper edge of the bowl.

A motor M is fastened to the upper side of the cover by means of machine screws 5 and nuts 6, said motor being fixed in spaced relation to said cover by tubular spacers 7. A shaft 8 fastened for rotation with rotor 9 of said motor extends downwardly therefrom and through a hole 10 in the center of the disc 3. Said hole is sufficiently large to prevent the shaft from touching the cover 3, yet it must not be so large as to permit foreign substances to readily enter the motor housing hereinafter described. To further protect the motor from such substances, a central portion of the cover 3 is provided with a conical formation which extends downwardly a short distance into the bowl. This expedient serves to bring the hole 10 further away from the lower motor bearing 12, making it more difficult for any substance that enters the hole 10 to reach the lower bearing or rotor, where it may interfere with satisfactory operation of the motor. Moreover, since after using the device the entire cover mechanism may be removed from the bowl and inadvertently placed upside down allowing some substance, which may cling to the shaft, to creep downwardly along said shaft, with the hole 10 made sufficiently small and the circular portion 11 of the cover adjacent the shaft shaped conically, as shown, the tendency in such instances would be for the substance (especially whipped cream) to leave the shaft at point 10, rather than enter the motor housing. Furthermore, any liquid which may from time to time enter the motor housing is prevented from accumulating therein in appreciable amounts because the portion 11 which forms the bottom of said housing serves as a funnel to guide the liquid outwardly through the only available opening in the motor shell.

To further prevent liquids from entering the motor housing through hole 10 a conical washer 14 may be disposed on the shaft 8 in closely spaced relation to the portion 11; the washer being fastened for rotation with the shaft. This expedient acts as a trap, because when the entire unit is inverted, the washer 14 prevents liquid from entering the motor housing through hole 10; but should liquid otherwise enter the motor housing it will, during normal operation of the device, be guided by the funnel 11 through the opening 10 and onto the upper surface of the washer 14 where centrifugal force will throw it outwardly.

The motor M is of the squirrel-cage induction type, being operable on single-phase alternating current circuits. It depends for starting and running torque upon the rotating or shifting magnetic field, such phase displacements being occasioned by the presence of shading coils 15 which embrace diametrically opposed polar portions of the stator 16. These coils, in effect, divide each half of the stator into two sections; i. e., a section 17 which when energized is threaded by a magnetic flux due directly to the current in the winding 18 and which unshaded flux is in phase with the main flux in the core 16 and a section 19 which, due to secondary currents induced into the shading rings 15, is threaded by a lagging magnetic flux.

Bearings 12 and 13 are supported by means of brass straps 20, said straps being fastened to the stator 16 by means of screws and nuts 21 and 22, respectively. Suitable spacers s, on the screws 21, serve to space the bearing straps 20 away from the stator.

The rotor 9 is of the usual squirrel-cage construction and when operated on a 60-cycle A. C. circuit, will develop a speed of about 2150 to 3300 R. P. M. dependent upon the number of magnetic teeth and copper inductor bars therein and upon the efficiency of the magnetic circuits in the motor.

With this type of mixer it is important that a mixing receptacle of proper size and shape be employed. To obtain best results for certain liquids, I have found that there exists a definite relationship between the inner contour of the bowl, especially near the bottom, the size and shape of the paddle and the power, or operating characteristics, of the motor with respect to the load imposed thereon due to the friction encountered by the paddle in the liquid.

It has been the practise in conventional types of mixers or cream whippers to employ relatively moveable parts for the mixer element. A well known and widely used type employs two round hoops that rotate in opposite directions. This type, when electrically operated, is usually driven by a universal type motor at a speed under 1800 R. P. M. Such mixers may be operated at relatively slow speeds because the paddles possess a large area and depend, for their action, upon one element forcing the liquid being mixed against the other element. Besides being relatively complicated these mixers are comparatively difficult to clean—an important feature in a device of this kind. This is especially true when the rotating hoops intermesh with one another.

Double hoop mixers employing small universal motors are therefore not wholly satisfactory for all household uses. This, because when economically constructed such a small motor with little power would indeed be overloaded when, for example, a hard lump of ice cream would be thrown by one hoop against the other one, thereby blocking their rotation. Such motors, having wound rotors and commutators, when stopped in this manner may soon burn out, because while held stationary the armatures thereof would be unable to generate a counter-E. M. F. and the current passing therethrough would be excessive.

In order to overcome this objection it has been necessary to employ much larger and more expensive motors which will pull through such extra heavy loads. This necessary precaution has heretofore prohibited the construction of small and inexpensive drink mixers which operated satisfactorily.

The paddle 23 is shown in the preferred form as an oval hoop fastened at 24 to the lowermost end of the shaft 8 so as to rotate with the latter. To obtain best results this paddle should be made of a strip of metal between $\frac{1}{16}$ to $\frac{1}{8}$ of an inch wide and approximately 6 inches long.

With the type of motor described, and shown in Figs. 1 and 2 the paddle just described may encounter sufficient resistance to hold the rotor against rotation without injuring the motor, since the current rise would be almost negligible. This, because such a motor is not largely dependent upon the armature reaction for its current-limiting factor in the field winding 18 thereof. This is especially true in the particular field construction shown in Fig. 1, where the two opposite halves of the field poles are joined together, or bridged, by magnetic shunts 16' made integrally with the stator laminations 16. Such magnetic shunts obviously permit an appreciable amount of flux to thread the magnetic circuit excluding the rotor and, therefore, cause the motor to operate with a comparatively large wattless component. This feature further prevents a large current rise in the winding 18 when the rotor 9 is held against rotation. It will thus be apparent that this arrangement permits the use of a small and inexpensive motor, without the danger of heavy loads imposed thereon causing excessive currents in the windings thereof. In practise I have found that a motor of this type which develops less than 1/25 H. P. gives satisfactory results.

Were a conventional universal motor having sufficient power to overcome the heavy loads heretofore mentioned fastened to the cover 3 as shown, then any body tending to retard or hold the paddle against rotation would cause a marked tendency of the entire motor and cover to rotate in the opposite direction. This would be aggravated by the fact that the shaft 8, being necessarily long, would cause a vibration of the entire motor and cover, especially when the paddle would intermittently strike a more solid mass. With such a long shaft this vibration is accompanied by a wobbly or orbital movement of the cover on the rim of the bowl, this movement being especially violent when the paddle strikes a tangential blow against a piece of ice or other solid substance floating in the liquid being mixed.

A cup-shaped sheet metal stamping 25 comprises the motor housing. Lugs 26, 27 and 28 are made integral with the lower edge of the shell 25 and provide a means for fastening the latter to the cover 3 by first inserting said lugs into slots in the cover and thereafter bending said lugs, thus securing the two stampings rigidly together in a well-known manner.

Between one side of the motor housing 25 and the adjacent side of the cover 3 an arcuate opening 29 is provided. This slot in the cover has three of its sides 30 formed downwardly, or bevelled. One purpose of this slot is to permit the addition of ingredients to the mixture in the bowl while the motor is running, without having to remove the cover. This is an important feature, since many recipes call for the addition of substances during mixing. For example, some salad-dressing recipes call for the slow addition of olive oil or vinegar while mixing. The slot is therefore made arc-shaped, to facilitate the addition of such ingredients into the bowl from teaspoons or tablespoons with which such substances are often measure.

The eccentric relation of the rotor, with respect to the stator or the motor housing 25, permits of disposing the rotor concentric relative to the cover and bowl while the substantially round housing is fastened eccentrically on the cover. This arrangement provides a large area on the cover which is available for the slot 29. The importance of this eccentric disposition of the motor on the cover will become even more apparent when it is noted that in adding ingredients to a mixture through the opening 29 while the motor is operating, better results are obtained when the added substances are introduced into the center of the whirling liquid or directly against the sides of the hoop 23. Obviously, if the housing 25 were disposed concentrically on the cover 3 the slot 29 would necessarily be made narrower and moved closer to the periphery of the cover, making such introduction of added substances impractical.

In order to avoid the possibility of liquids entering the motor housing adjacent the opening 29, the lug 28 adjacent thereto extends the entire length of the opening, so that liquids cannot possibly run between the edge of the motor shell and the cover at this point.

Another important advantage brought about by fastening a motor of the construction described onto the cover of a mixing bowl is due to the eccentric disposition of said motor on the cover. This arrangement confines most of the weight of the motor towards one side of the cover and this confined radial displacement of the weight with respect to the shaft helps to prevent the cover from turning, especially during vibration of the latter transmitted through the shaft as heretofore described. The removal of metal to form the hole 29 helps to further unbalance the distribution of weight on the cover, for this purpose. Moreover, since the metal cover, which is a good conductor of heat, forms the bottom of the motor housing, the remaining comparatively large area which extends beyond the shell 25 helps to dissipate a good deal of the heat developed by the short-circuited coils, or shading rings 15, necessarily employed in this type of motor.

In the whipping of cream the action of the device is as follows: With reference to Fig. 2, which shows the bowl in actual size, a half-pint of liquid will occupy a level slightly above the middle of the oval paddle shown. When current is applied to the winding 18 the small mass of the rotating element which possesses no windings or commutator, permits the rotor to almost instantly attain maximum speed. To attain the proper speed heretofore mentioned as being between 2150 to 3300 R. P. M., this rotor should have between 8 to 14 copper inductor bars and an equal number of rotor teeth.

The cream will rapidly accelerate in speed, the whirl taking the shape indicated by the dotted line 31. Due to the contour of the bowl following a large radius at 32, the whirl of thick cream assumes this shape, thereby contacting a comparatively larger area of the glass, which area increases the friction tending to prevent the cream from whirling. Thus the particles of butterfat in the cream obtain the requisite agitation or friction due to the rapid rotation of the liquid adjacent the agitator and the slower speed thereof near the periphery of the bowl. With ordinary whipping-cream after but several seconds of mixing the whirl takes the shape shown by dotted line 33. At this time the cream commences to whip and due to the radius of the bowl at 32, which I have found should be in excess of $1\frac{3}{8}$-inches, for a bowl having a diameter at the level of the top of the paddle in excess of 3 inches, the whirl will be accompanied by a definite though comparatively slow rotary circulation of the cream in a vertical plane, as indicated by the arrows. The cream, as it becomes whipped, is very light and clings to the glass bowl, leaving only the unwhipped cream to circulate in this vertical direction past the agitator. Since it is important that air be mixed with the cream, the upper portion of the paddle merely serves to maintain a hole in the whirl through which air may pass down and mix with the cream.

As the cream becomes whipped it levels substantially to line 34, partly filling the hole occupied by the rotating hoop. At this point and immediately prior thereto the speed and power characteristics peculiar to the particular type of motor described play an important part, because the paddle rapidly decelerates, permitting the whipped cream to enter the hoop and add still further load until, when the cream is entirely whipped, the added load due to the altered consistency of the whipped cream harnesses the motor down to a much slower speed. As will be presently explained, this is a decided advantage.

Now, if, as heretofore described, a conventional drink mixer motor not having a shaded-pole stator is employed, and if same is made weak enough to practically stop by the load encountered with the paddle in the whipped cream then the current rise in such a motor would be comparatively great. If, on the other hand, the size and resultant power of such a motor is increased so as not to slow down appreciably under such suddenly increased load conditions, then continued violent rotation of the paddle through whipped cream would soon churn same into butter. Inasmuch as ordinary whipping-cream is critical in that additional violent mixing of the whipped cream for but several seconds commences to churn same into butter, the prolongation of this critical period for even several additional seconds effects an improvement and renders the device more useful, obviating the necessity of close and careful attention to the cream as it becomes whipped. The results thus effected by employing a motor of the type described and in which the rating thereof for the final line voltage is under 1/25th horsepower are important, especially when it is learned, as I have found by experiment, that additional violent mixing of the cream for less than 1 minute commences to spoil the whipped cream by turning same into butter. In using such a motor under the above specified rating, although it may have sufficient power to thicken or whip the cream, it may still be sufficiently weak to be left turned on for several times this period without spoiling the cream; indeed the current may be left turned on for even several hours while the mixing element is thus loaded to a comparatively slow speed, if not a complete stoppage, without harming the motor windings.

Another useful feature of novelty results in combining a motor of this construction to other elements, for the purpose described. It will be noted from the drawing that the rotor employed to turn the shaft is made unusually small for a useful power motor, being actually .7 inches in diameter and .7 inches long. Motors employed in conventional drink mixers heretofore possess rotors usually in excess of 1¼ inches diameter and about 2 inches or greater, in length. Such comparatively large armatures comprise massive rotors which due to the inherent inertia greatly increase the vibration of the cover and the tendency of the latter to rotate, as heretofore explained. Now I have found, by providing a rotor (and by rotor I hereinafter refer to the actual motor rotor proper and independent of the shaft, agitator, or other parts rotating therewith) which weighs less than 4.7 ounces (avoir.) that this vibration is not only minimized but that the device is greatly improved for certain liquids, particularly whipping-cream, and for the following additional reasons:

Again considering the action while cream is being whipped, beyond the point when practically all of the cream is thickened, with the exception of that portion adjacent to and within the paddle, the latter will rapidly decelerate in speed, losing within but 2 to 10 seconds an appreciable if not substantial percentage of its former speed. In any event the drop in speed is remarkably rapid and quite apparent. However if the rotor was possessed of adequate inertitude to remain unresponsive to the suddenly changed consistency of the cream, then the paddle would throw the thickened cream outwardly from intimate contact therewith thereby releasing itself from the load, a large hole would be formed in the stiffened cream, and the rotor would thereafter resume if not exceed its initial speed. While the rotor is thus racing the slightest vibration will cause the cream to contact with the outside of the hoop and start converting the cream into butter. This action will be cumulative, since butter will cling to the hoop, dragging more cream therein. With the formation of butter, the comparatively thin buttermilk will be thrown outwardly, further washing more of the whipped cream toward the active middle portion of the bowl and hastening the churning process.

Where the weight of the motor rotor is kept below 4.7 ounces, the attendant inertia is not sufficient to help the motor break through the suddenly increased load (which occurs when the cream is finally whipped) at its initial violent speed. On the contrary, the small weight of the rotor permits it to slow down very suddenly and, if desired, the motor may be made so weak as to then actually stop under the load of the thickened cream.

Referring particularly to Fig. 2, a portion of the housing 25 is shown cut away to expose an automatic switch which may be provided to disconnect the motor M from the line when the cover 3 is removed from the mixing bowl. This switch comprises a pair of contact springs 35, each of which carries a contact-point c adjacent one end thereof. Said springs normally hold the points c apart and means are provided for closing the contacts when the cover is placed over the bowl 1. Said means comprises a spring 36 fastened to the bottom of the cover by a rivet 37. Apart from a small portion of the spring 36 adjacent the rivet 37, said spring normally holds itself spaced away from the cover. When the cover is placed on the bowl, the free end of the spring 36 is pressed upwardly against the cover, and this upward movement causes a finger 38 carried by said spring to move the lowermost contact c into registration with the other contact point. Finger 38 is preferably made of a suitable insulating material and passes through a hole provided in the cover 3. The spring 36 is sufficiently yieldable to permit pin 38 to close the contacts due to the weight of the motor. The contacts are connected in series with the coil 18, and said springs 35 are supported by insulating washers 39 and a rivet 40. A suitable cord 41 enters the motor housing through a bushing 42, and serves to connect the coil 18 to the alternating-current supply circuit.

Having now described my invention in a preferred form, and having stated reasons for the combination of elements contained therein and their relation to one another, certain modifications may suggest themselves which are considered within the spirit and scope thereof. For example, member 3 may contain a plurality of slots 29. Again, said member may comprise a disc which merely closes the bottom of the shell 25 and this disc may, in turn, contain 3 or more integral spokes which extend radially beyond the rim of the bowl, for supporting the motor from said bowl.

In accordance with certain provisions of the patent statutes, I have herein described the structure and principle of operation of my invention, together with the arrangement of parts which I now consider to represent a preferred embodiment thereof; but I desire to make it clear that the particular apparatus shown and described is only illustrative and that the invention, as defined in the appended claims, may be carried out by other means.

I claim:

1. In a device of the class described, the combination with a mixing receptacle, of an electric motor disposed thereover and supported solely thereby, an inclosing casing for said motor surrounding the same, an electric switch mounted within said motor casing and connected therein directly with the winding of said motor, said switch being supported directly from the magnetic stator of said motor, a mechanical switch-operating member disposed externally of said casing, said member being mechanically connected but electrically insulated from said switch and adapted to operate said switch through the wall of said motor casing by the presence of said motor on said receptacle.

2. In an electric cream whipper, the combination with a mixing receptacle and an electric driving motor, of a paddle member driven by the shaft of said motor and comprising a thin strip of material formed so as to travel through a substantial portion of the volume occupying the lower half of said receptacle and to minimize its rotational resistance by being rotated substantially edgewise of said strip through the cream, said motor having a squirrel-cage rotor, and a stator for said rotor having closed shading coils, the magnetic relation between said rotor and stator due to the shifting magnetic field caused by said shading coils being such as to exert a torque on said rotor to maintain an initial mixing speed sufficient to whip the cream by said paddle while having an output sufficiently under 1/25th horsepower to cause said paddle to slow down considerably under the increased load when the cream is whipped.

3. In an electric mixer adapted to mix a liquid such as whipping-cream and the like from one consistency to another, the combination with a mixing receptacle and a shaded-pole motor having a shaft, a squirrel-cage rotor for rotating said shaft and a stator for said rotor having closed shading coils embracing diametrically opposed polar portions of the stator, of a mixing element in said receptacle driven by said shaft and comprising a member shaped so as to present a narrow forward edge which cuts through the liquid in said receptacle during rotation thereof about the axis of said shaft, the rotational resistance given to said element by the liquid due to the shape and area of said edge being so related to the power output of said motor as to cause said element to mix said liquid at a speed sufficient to increase the consistency thereof, and said motor output being sufficiently below 1/25th H. P. to cause said motor and element to slow down considerably due to the increased load offered by the altered consistency of said liquid.

IRVING NACHUMSOHN.